W. A. SWAREN.
VOTING MACHINE.
APPLICATION FILED AUG. 26, 1903.
1,038,680.
Patented Sept. 17, 1912.
6 SHEETS—SHEET 1.
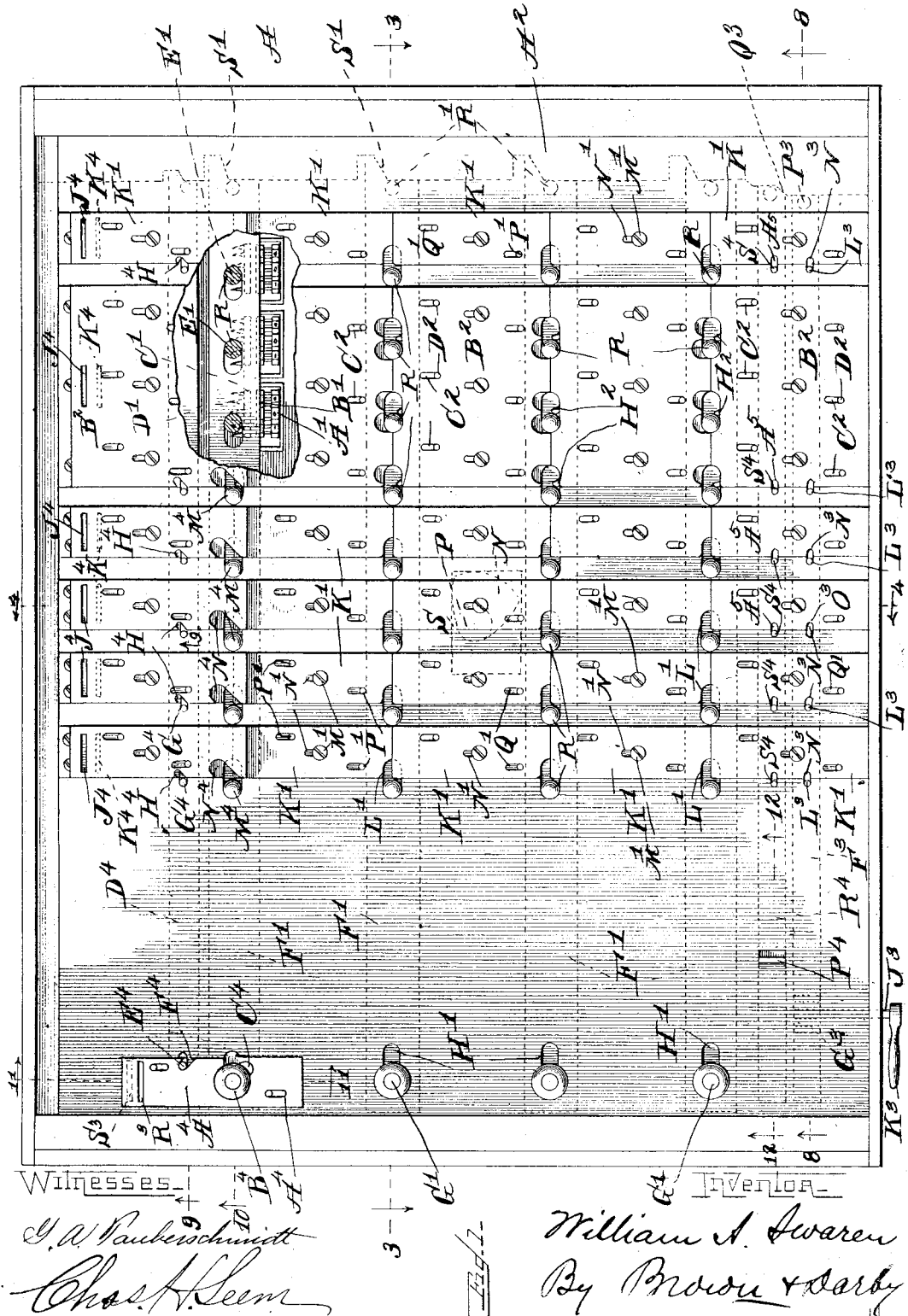

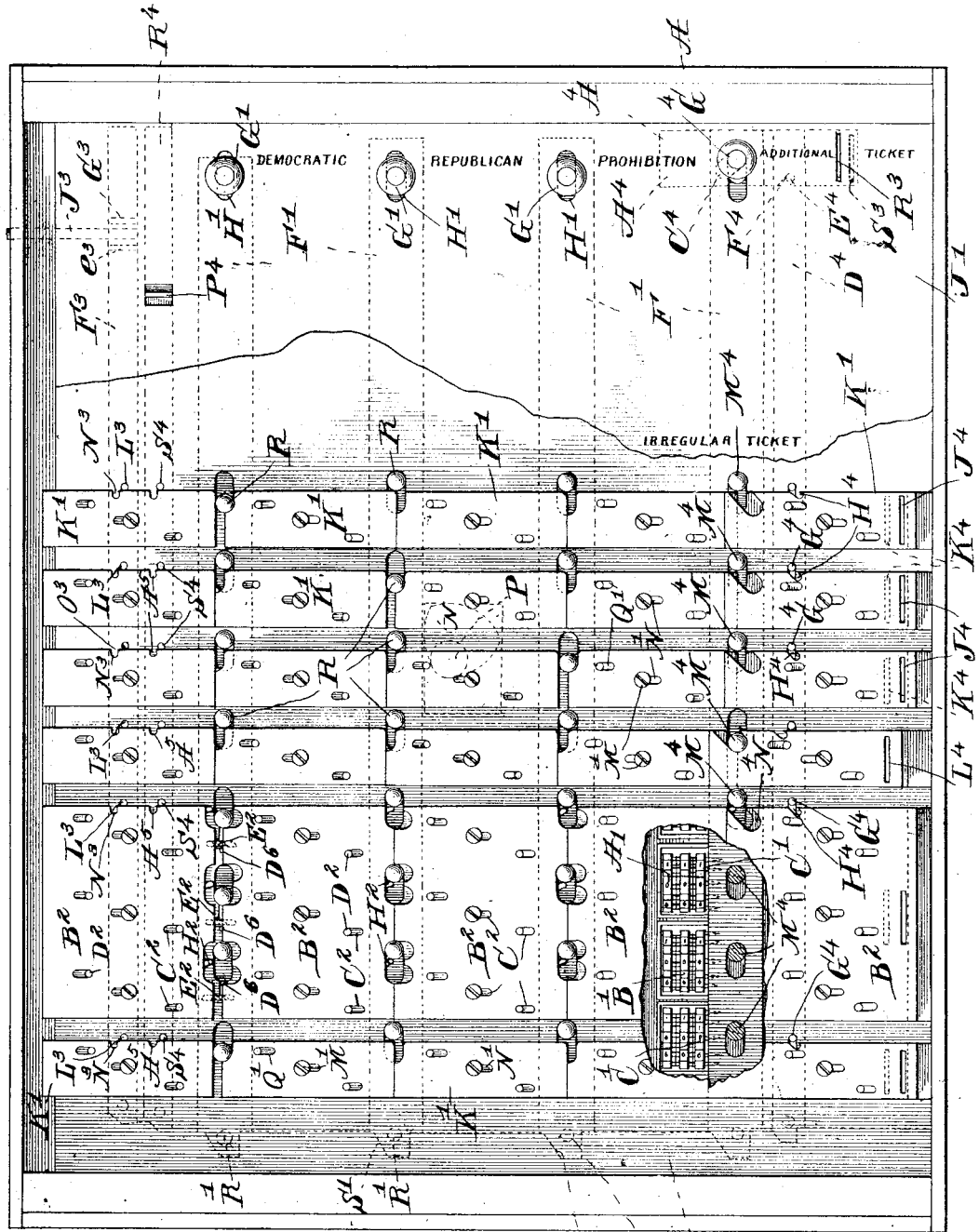

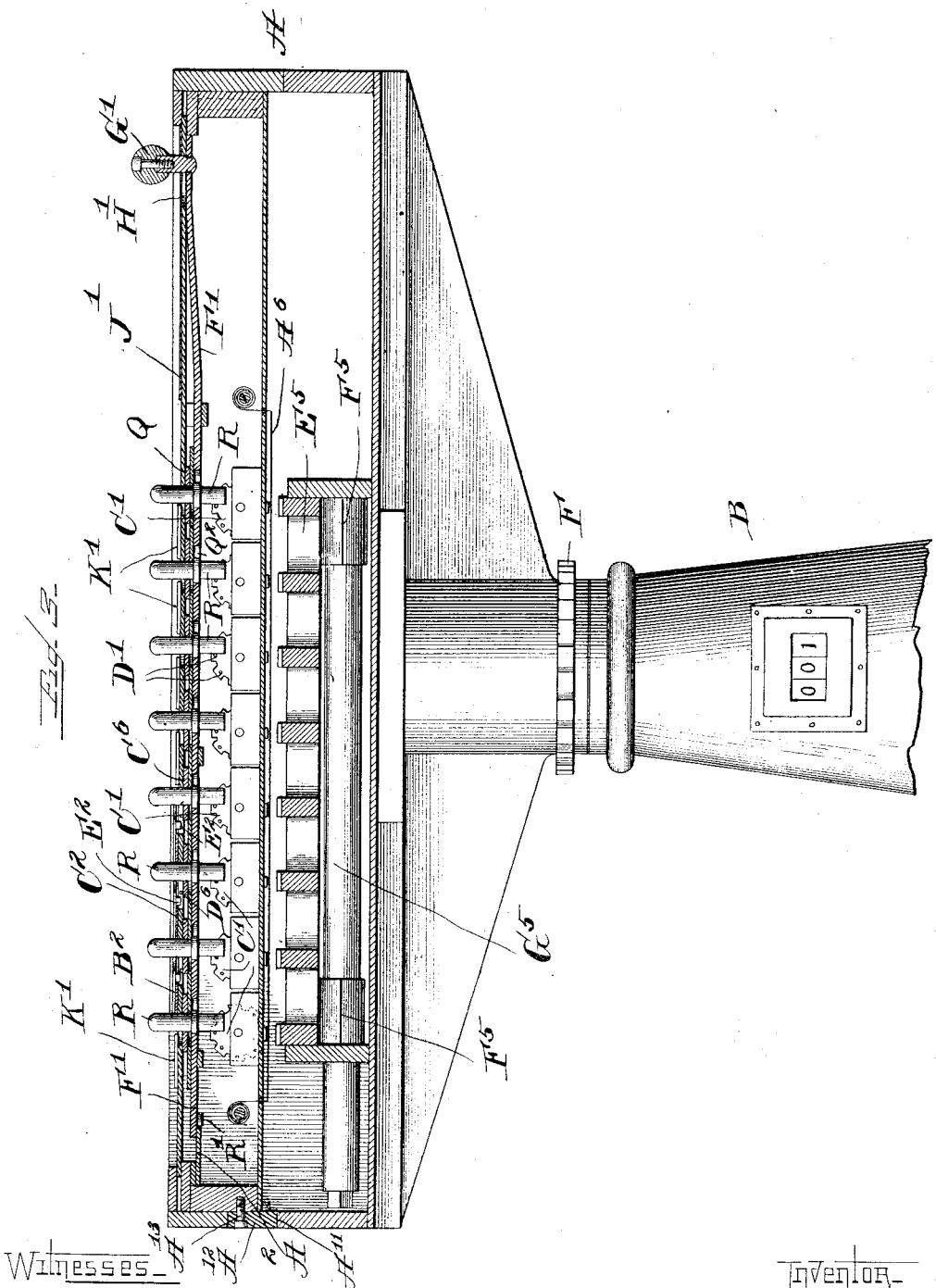

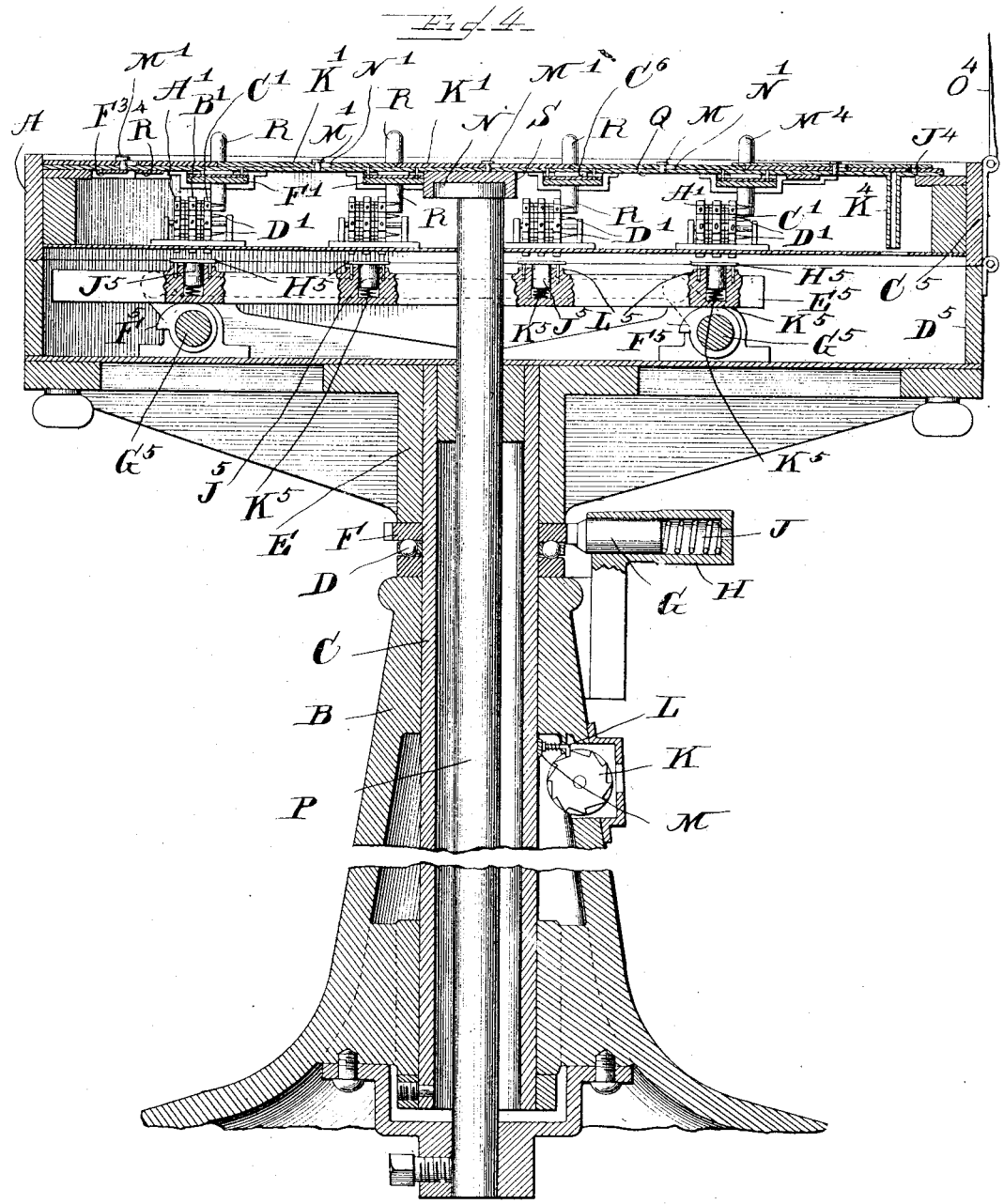

W. A. SWAREN.
VOTING MACHINE.
APPLICATION FILED AUG. 26, 1903.
1,038,680.
Patented Sept. 17, 1912.
6 SHEETS—SHEET 5.
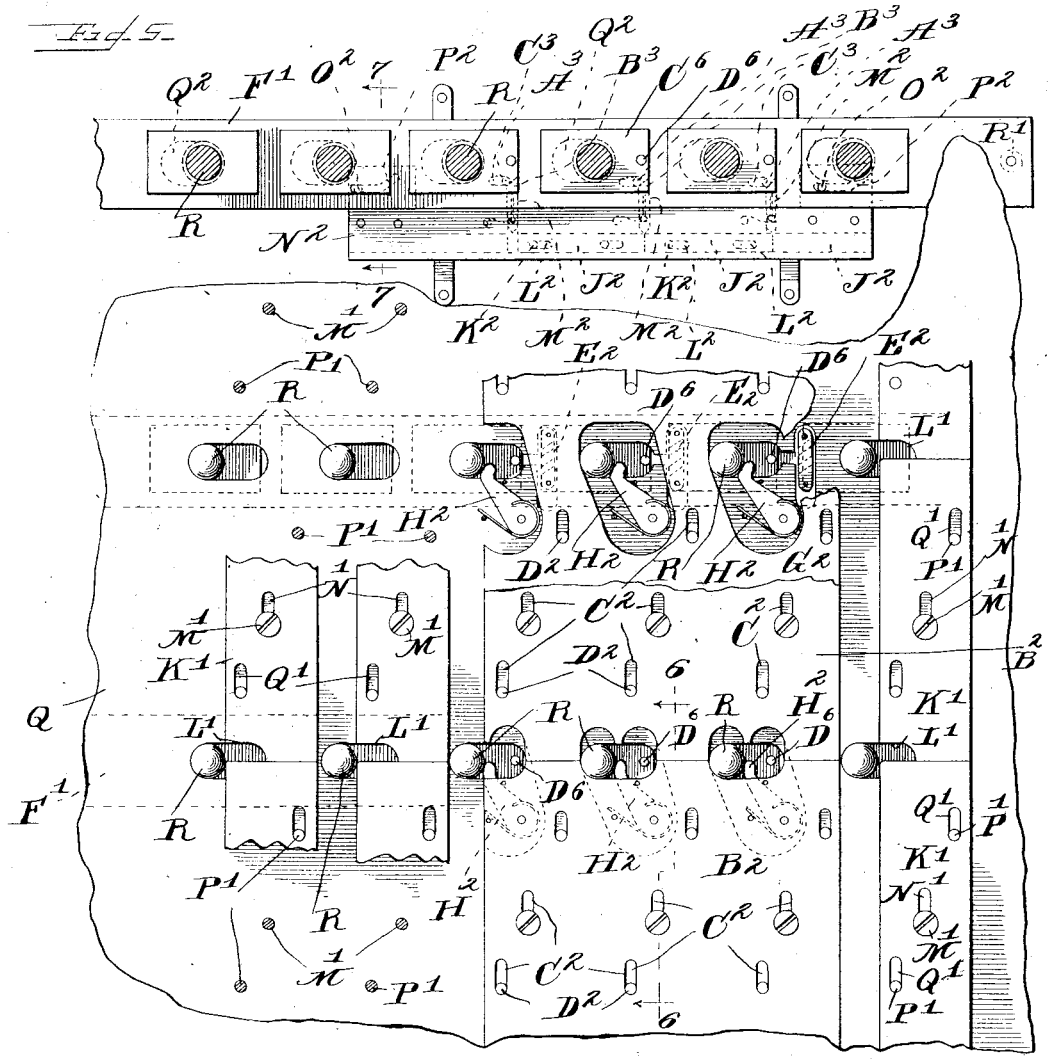
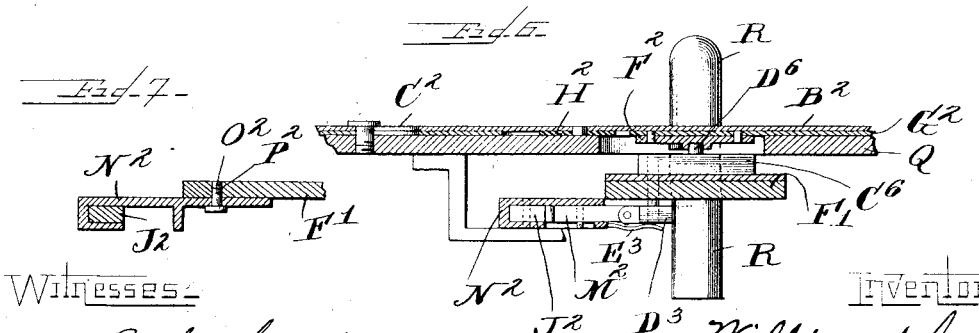

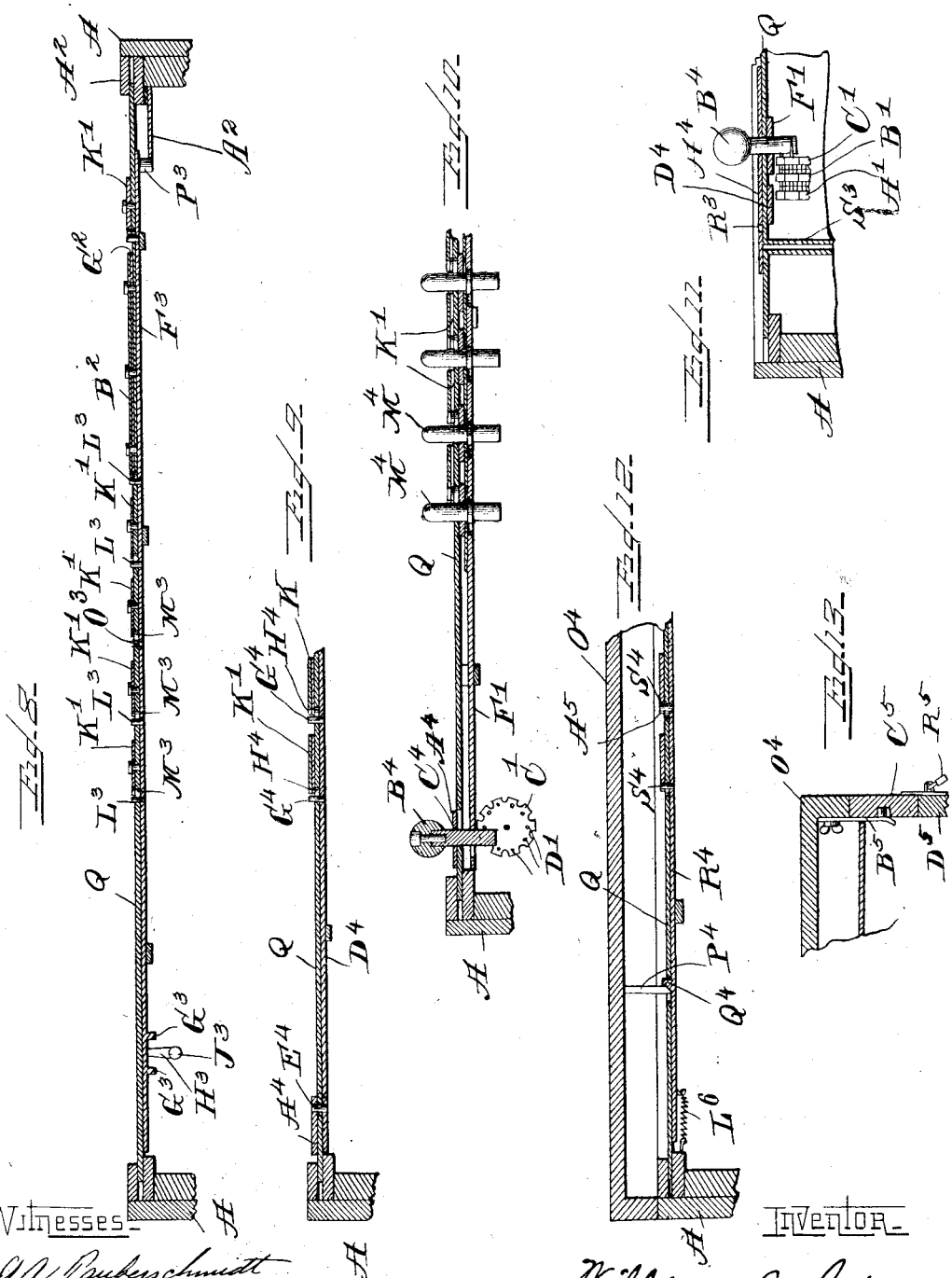

UNITED STATES PATENT OFFICE.

WILLIAM A. SWAREN, OF CHICAGO, ILLINOIS, ASSIGNOR, BY MESNE ASSIGNMENTS, TO INTERNATIONAL VOTING MACHINE COMPANY, OF ELGIN, ILLINOIS, A CORPORATION OF ILLINOIS.

VOTING-MACHINE.

1,038,680.　　　　Specification of Letters Patent.　　Patented Sept. 17, 1912.

Application filed August 26, 1903. Serial No. 170,792.

*To all whom it may concern:*

Be it known that I, WILLIAM A. SWAREN, a citizen of the United States, residing at Chicago, in the county of Cook and State of Illinois, have invented a new and useful Voting-Machine, of which the following is a specification.

This invention relates to voting machines.

The object of the invention is to provide a construction of voting machine which is simple and efficient, wherein a voter may vote a straight or a scratched ticket, but is permitted to vote for only one candidate for each office except in the case where cumulative voting is allowed for particular candidates.

A further object is to provide means which are simple and efficient for locking the apparatus to prevent access to or tampering with the registering mechanism.

A further object is to provide means which are simple and efficient, whereby the casting of group as well as cumulative votes for special candidates are permitted.

A further object is to provide means which are simple and efficient for accurately registering the total vote cast as well as the total vote for any individual candidate.

A further object is to provide means which are simple and efficient wherein the voter is enabled to arrange his ballot in any desired manner, that is, may vote a straight ticket or for any desired candidate for any particular office, or may alter or vary the arrangement of his ballot as he may desire up to the time the registration takes place.

A further object is to provide means which are simple and efficient whereby the ballot is arranged throughout as desired by the voter and the parts are so locked in such arrangement as to prevent derangement thereof, before the registration or counting takes place.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the accompanying drawings, and to the various views and reference signs appearing thereon,—Figure 1 is a view in plan, a part broken out and the top or cover removed, of a voting machine embodying in its construction the principles of my invention, the parts being in the positions thereof ready for the voter to enter the voting booth and turn the machine to position for preparing a ballot as in Fig. 2. Fig. 2 is a view similar to Fig. 1, showing the parts in the positions thereof in the process of arranging the ballot, and illustrating the principles of my invention. Fig. 3 is a view in vertical longitudinal section on the line 3—3 of Fig. 1, looking in the direction of the arrows. Fig. 4 is a view in vertical transverse section on the line 4—4 of Fig. 1, looking in the direction of the arrows. Fig. 5 is a broken view partly in horizontal section and partly in top plan, the top plate being broken out and parts broken off, and illustrating a construction embodying the principles of my invention. Fig. 6 is a broken detail view in vertical section on the line 6—6 of Fig. 5, looking in the direction of the arrows. Fig. 7 is a broken detail view in section on the line 7—7 of Fig. 5, looking in the direction of the arrows. Fig. 8 is a vertical longitudinal section on the line 8—8, Fig. 1, looking in the direction of the arrows. Fig. 9 is a broken detail view in section on the line 9—9, Fig. 1, looking in the direction of the arrows. Fig. 10 is a view in section on the line 10—10, Fig. 1, looking in the direction of the arrows. Fig. 11 is a broken detail view in transverse section on the line 11—11, Fig. 1, looking in the direction of the arrows. Fig. 12 is a broken detail view in section on the line 12—12 of Fig. 1, looking in the direction of the arrows. Fig. 13 is a broken detail view in section, showing the means for automatically locking the hinged top or cover.

The same part is designated by the same reference sign wherever it occurs throughout the several views.

In a voting machine of the character to which my invention relates, it is desirable and necessary to provide a construction wherein the movable parts of the apparatus concerned in arranging the ballot to be voted are efficiently locked and interlocked when the arrangement of the ballot is once completed, so as to prevent disarrangement thereof, as well as to prevent fraudulent voting and so as to enable the registration to be made of the ballot as arranged, while permitting at any time up to the final registration of the ballot any desired change in the arrangement of the ballot, thereby enabling the voter to vote for any desired candidate and insuring that when he has once arranged his ballot that ballot so arranged will be registered as arranged, whether a straight ticket or a split or special ticket is voted.

It is among the special purposes of my present invention to provide a construction of voting machine for accomplishing this object.

It is among the special purposes of my my invention to provide a construction of voting machine which is simple and efficient for registering the vote cast for each candidate whether such candidate be a party candidate or an independent candidate. A convenient arrangement for accomplishing this purpose and embraced within the spirit and scope of my invention is shown in the accompanying drawings and will be hereinafter more fully described, wherein the registering mechanism is disconnected from the movable parts concerned in the arrangement of the ballots, thereby enabling such movable parts to be set into proper position to effect a register before such parts are actuated or shifted to effect the registration.

It is also desirable in an apparatus of this nature to provide means whereby a voter may cast his ballot for any desired candidate whether regularly nominated or not for a particular office and whereby when the ballot is arranged to vote for a particular candidate or a candidate for a particular office no other candidate for the same office can be voted for it.

It is further desirable to provide means whereby cumulative voting is permitted, that is, where it is possible for the voter to exercise his right when permitted by the voting laws of the locality, to vote one or more votes for the same individual in a case, for instance, where two or more candidates for the same office are to be elected and it is permitted the voter to cast a ballot for each of the two or more candidates to be elected, or if he so desires to cast two or more votes for the same candidate or for a group of candidates.

These, among others, are the special purposes of the present invention.

Referring to the accompanying drawings, reference sign A designates a box or casing of suitable construction and arrangement and material, adapted to contain the apparatus.

B designates a stand or pedestal upon which the box or casing A is mounted for rotary movement in one direction. A convenient arrangement is shown, but to which I do not desire to be limited or restricted, wherein a sleeve C, (see Fig. 4) is vertically arranged within the stand or pedestal B, to revolve in bearings in said pedestal or stand, and having mounted upon the upper end thereof the box or casing A. If desired, and in order to facilitate rotary movement of the casing A upon the pedestal or standard, a ball bearing, indicated at D, may be interposed between a central hub E of the chamber or casing and the supporting stand or pedestal B. If desired, and in order to permit rotary movement of the casing A in one direction only, a ratchet wheel F may be mounted to rotate with the chamber or casing A, and engaged by a spring pressed pawl, G, thereby permitting rotary movement of the casing upon its supporting pedestal or stand in one direction only. The pawl G may be mounted or supported in any suitable or convenient manner. I have shown said pawl operating within a cylinder H, with a spring J arranged therein and exerting its tension upon said pawl to force the same into engaging relation with respect to the teeth of the ratchet wheel F. If desired, and preferably, a registering mechanism may be provided whereby the rotary movements of the casing A may be registered. This result may be accomplished in any suitable or convenient manner. I have shown a simple arrangement for accomplishing the desired object, wherein I mount counting wheels, designated 0, 0 and 1 in Fig. 3, in the ordinary manner of register wheels, that is, upon a complete rotation of each wheel the next adjacent wheel is advanced one step of its rotary movement. A ratchet gear K is connected to the units wheel of these counting wheels and is given one step of rotary movement by means of a spring pressed pawl L, whenever actuated by a cam projection M, upon sleeve C, so that upon each revolution of sleeve C, spring pawl L is actuated to impart one step of rotary movement to ratchet K, and this ratchet being connected to the units counting wheel it will be seen that this mechanism will register the number of revolutions imparted to sleeve C, and hence to the casing.

In accordance with the principles of my invention I arrange the apparatus to effect the registrations of the ballots for individual candidates by the rotary movements imparted to casing A upon its supporting stand or pedestal B, and I also provide means actuated by the rotary movements imparted to the stand for not only registering the ballot as arranged by the voter, but also for restoring the parts to normal position after a ballot has been prepared and voted and registered. A convenient arrangement for accomplishing this purpose is to cause each voter to turn the casing A a half revolution upon entering the voting booth to prepare his ballot, this movement placing the mechanism concerned in the arrangement of the ballot and in registering the same in normal position ready for a ballot to be arranged. After a voter has completed the arrangement of his ballot according to the way in which he desires his vote to be counted, he gives the casing another half turn upon coming out of the voting booth, thereby effecting a registration of the ballot as prepared by him, and also returning the mechanism to normal position and locking the same. I desire it to be understood, however, that my invention is not to be limited or restricted to a casing or a registering mechanism dependent upon rotary movements imparted to the casing, as the same result may be accomplished in other ways, but the arrangement above specified is simple and efficient and admirably answers the desired purpose and object. In the particular form shown and above described wherein the registering movements of the parts and their return to normal position are imparted by the rotary movements given to the casing A, as explained, I employ a cam head N, upon the end of a rod P, rigidly held centrally with respect to the axis of revolution of the table and about which the table revolves, said cam head being arranged to operate within a rectangular frame S, to shift longitudinally a plate Q, to which said bracket is connected, through the movements of which a series of voting keys or pins R are shifted laterally into or out of actuating relation with respect to their associated registering mechanism. The registering mechanism with which each of the pins R is associated may be of any suitable or convenient construction and arrangement adapted to be actuated one step upon each actuation of its associated pin R. I have shown a simple arrangement which I have found efficient in operation, but to which I do not desire to be limited or restricted, wherein is employed a series of groups of registering wheels A' B' C', the wheels C' each being provided with a series of pointed pins D', arranged to project laterally from the side or face thereof and between which the operating pins R are adapted to enter when properly actuated, as will be hereinafter more fully described, to impart a rotary movement through a given distance to said registering wheels C'. The several registering wheels A' B' C' are so relatively connected together that when the first wheel C' completes one complete revolution it imparts one step of rotary movement to the next adjacent wheel B', and when said wheel B' completes one complete revolution it imparts one step of rotary movement to the next adjacent wheel A', in an ordinary and well known manner. Preferably, and in order to facilitate the entrance of the pin R between the pointed projections D', said pins may be beveled, as indicated in dotted lines at E', see Fig. 1.

In the normal position of the parts as shown in Fig. 2, all of the pins R are held shifted laterally out of engaging relation with respect to their associated registering wheels C', so that said pins may be shifted either in unison or independently, according to the desires of the voter, into the proper position and arrangement for voting. This lateral shifting of the pins R to normal or voting position is accomplished by the half revolution imparted to the frame or casing A by the voter entering the voting booth, through the engagement of the bracket or frame S with the fixed cam head N. When in this position the voter is at liberty to shift the various pins R either in groups or individually, as will be hereinafter more fully explained, into voting position, and after the pins are properly arranged according to the voter's wishes a further half revolution of casing A upon its axis, as above explained, as for instance, when the voter leaves the voting booth, causes the plate Q to be shifted in the opposite direction or in a direction to cause the pins R to enter the space between adjacent pointed studs upon wheel C', and as will be more fully hereinafter explained, to impart one step of rotary movement to said wheel, thereby registering the votes according to the arrangement made by the voter while he was in the booth. This leaves the parts in locked position until the next voter enters the booth or imparts another half revolution to the casing A, which movement through the engagement of the cam head N with the bracket S, shifts plate Q and with it the register actuating pins R into normal voting position with the pins disengaged from the registering mechanism and in position to be again shifted or moved into position for the next ballot.

A pin R and an associated registering mechanism is provided for each candidate to be voted for. These pins are arranged in groups or sets, a set or group being provided for each party ticket, and provision is made for simultaneously shifting and actuating all the pins contained in a party group to enable the votor to vote a straight ticket. To this end a slide plate F' (see Fig. 3) is provided for the registering pins R composing each party group. The strips or plates F' are suitably mounted and guided to slide longitudinally in casing A and transversely with respect to the line of reciprocatory movements imparted to plate Q by the cam head N during the rotary movements imparted to casing A upon its supporting pedestal or stand. The several strips F' may be shifted in any suitable or convenient manner, as, for instance, by means of hand grips or party keys G', suitably connected to the strips F' and projecting through elongated slots H' in a key plate J'. When the casing A is rotated into position to release all the voting pins and to enable the voter to place the same into voting position, then a voter is at liberty by grasping a party key G' and shifting the same laterally to the extent of the limit of its slot H', to arrange the registering pin R to vote a straight party ticket. In other words, the shifting endwise of a strip F' carries simultaneously all the group of registering pins into proper position or relation to vote for all of the candidates of the particular party ticket with which the party key which will have been manipulated is associated, and when the voter leaves the booth and imparts the final half revolution to the casing A a vote is registered for all of the candidates of the party ticket voted, while at the same time, as, above explained, the voting keys or pins R are returned to normal position ready to be again shifted into voting position by the next voter who enters the booth and thereby imparts a half revolution to the casing A. However, to enable a voter to vote a split ticket or for candidates on each of several party tickets, provision is made, in accordance with the principles of my invention, whereby such result may be accomplished and this result is accomplished in the particular construction shown, but to which the invention is not to be limited or restricted, by associating with each voting key or pin R a locking mechanism, whereby when any one of the party keys is manipulated all of the other voting keys or pins of all the other party tickets or individual candidates is locked against being moved into registering relation, at the same time permitting the voter to unlock the voting key or pin of any other particular candidate for whom he may desire to cast his ballot.

An exceedingly simple and efficient locking mechanism is shown, comprising slide plates K' and arranged in sets, each set being arranged in line with each other transversely across the casing A and end to end with respect to each other. These plates are independently shiftable endwise. In one corner of each of the plates K' is formed a notch or seat L', into which the adjacent and associated voting key or pin R may enter. Each of the plates K' is held in position by means of a screw M', operating through a guide slot N' through said plate, and each plate K' is guided in its longitudinal movement by means of guide pins P' operating through guide slots Q', the guide pins P' being stationary in the main operating plate Q. The extent of longitudinal movement of all the plates K' contained in a transverse row or series amounts in the aggregate to a sufficient space to accommodate a voting pin or key R between the adjacent ends of one pair of such plates.

Thus, when any particular voting key or pin R is projected so as to enter a slot L' between the adjacent ends of two of the plates K', all of the other plates of the same transverse row or series are shifted longitudinally into such position as to prevent any voting key or pin corresponding to the same candidate on another ticket from being shifted or moved into position between such plates K', thus constituting an efficient lock to prevent the voter from voting for more than one candidate for any one office, as the movements of the voting keys or pins R into position between proximate ends of adjacent plates K' is necessary in order to bring said keys or pins into voting position. Thus, it will be seen that when a party key G' is shifted to the extent of its movement from the position thereof as shown in Fig. 1, for instance, to voting position, all of the voting keys or pins R associated with the particular party key manipulated will be caused to enter between the proximate ends of adjacent pairs of lock plates K' for each candidate on the party ticket, thereby carrying or moving the voting keys or pins R into voting position for all the candidates on the party ticket; the same movement by reason of the wedging of the voting keys or pins R into the notches or seats L' of the locking plates K', shifts all of the lock plates K' into such position as to prevent any other party key G' from being manipulated, as well as to lock the individual candidate keys or pins of other parties from being operated so long as all of the voting keys or pins of the party ticket manipulated remain in their advanced or voting positions. However, the mere shifting or manipulation of a party voting key G' and the corresponding shifting of the voting keys or pins corresponding or associated with such party key into voting position accomplishes nothing beyond the moving of said keys or pins into voting position and the locking of all of the other voting keys or pins of the machine. Consequently, even after a party key has been shifted the voter is still at liberty to alter his vote in any manner he desires. He may alter the entire party vote and vote any other straight party ticket by merely returning or restoring the particular party key which he had previously manipulated and manipulating the party key corresponding to another party ticket. He may also change his vote for any particular candidate on the party ticket which he has voted so as to enable him to vote for some other candidate for the same office by merely returning or restoring the voting key or pin corresponding to the particular candidate on the party ticket against whom he desires to vote and correspondingly manipulating the voting key or pin of the particular candidate for the same office for whom he does desire to vote. This operation is performed after a party ticket has been voted by simply restoring to normal the party voting key or pin of the party ticket originally voted, thereby restoring all of the voting keys or pins associated therewith to their normal position, and then shifting the party key of another party, or after a party key has been manipulated to vote for all the candidates associated therewith then restoring the voting key or pin of any particular candidate on that party ticket, which movement does not affect the remaining voting keys or pins of the party ticket voted, but releases the lock of the voting keys or pins for the corresponding candidate on all of the other tickets, thereby leaving the voter free to change his vote for any particular candidate on a particular party ticket to some other candidate for the same office on another party ticket.

The operation above described is clearly illustrated in Figs. 1 and 2. In Fig. 1 the parts are shown in the position occupied just after a vote has been registered and with the voting pins or keys in engaging relation with respect to the registering mechanism, as shown in the space broken out in Fig. 1, and ready for another voter to enter the voting booth. Upon entering the voting booth the casing A is given one-half revolution from the position shown in Fig. 1. This movement brings the casing into the position shown in Fig. 2, and carrying all the voting keys or pins R out of engaging relation with respect to the registering and recording mechanism and into position ready to be voted. In Fig. 2 the voting key for the Democratic ticket has been shown after being manipulated, thereby carrying the voting keys or pins associated with the Democratic ticket into voting position. Thereafter the voter apparently and as shown has returned or restored the voting keys or pins for the second, third and fourth candidates to their normal voting position, leaving the voting key or pin for the first and last candidates on the ticket and for two of the group candidates hereinafter to be referred to, in voting position. This leaves the individual voting key or pin of all of the other candidates at the head and foot, or first and last candidates of the various tickets, locked so as to prevent a vote from being registered for these particular offices on all of the tickets except the first or Democratic ticket. As shown, the voting pin or key corresponding to the second candidate on the Democratic ticket has been restored to normal position, while the corresponding voting key or pin on the Republican ticket has been thrown into voting position, thereby locking all of the lock plates K' corresponding to all the other candidates for that particular office against the possibility of being manipulated, thereby insuring the casting of only one ballot for one candidate for that particular office. The third voting key or pin corresponding to the candidate for the third office on the ticket is shown as having been voted on the Prohibition ticket, while the voting key or pin corresponding to the fourth candidate on the ticket is shown as having been placed in voting position for a party on the ticket marked "Irregular ticket." Up to this time, however, any other alteration or change may similarly be made by the voter inasmuch as the placing of the voting keys or pins into proper voting position accomplishes nothing, as above explained, beyond locking the voting keys or pins for the corresponding or the same candidate on other tickets against the possibility of being manipulated or moved into voting position so long as the voting key or pin corresponding to any particular candidate has been shifted or moved into voting position. Thus, it will be seen that the voter has complete control over his vote or over the arrangement of the voting keys or pins up to the time he is satisfied with the arrangement of his ballot. Then by the act of leaving the voting booth, as above explained, that is, by imparting a half revolution to the casing A, as for instance in leaving the booth, all of the keys or pins R which have been set into voting position are shifted back to the position shown in Fig. 1, thereby operating the registering mechanism associated with each of the voting pins or keys which had been manipulated by the voter into voting position while he was occupying the voting booth. This complete revolution of casing A is also registered in the registering device K, so that at the close of the polls said registering device K will indicate the total number of ballots cast, while the registering wheels A' B' C' associated with each candidate or office on each party ticket will register the total number of votes cast for the individual candidates, whether straight or party tickets or a split or independent ticket has been voted. All of the voting keys or pins may be restored to normal position and the votes registered according to the voter's arrangement by the final half revolution given to casing A in any simple, suitable or convenient manner. I have shown this operation accomplished by means of pins, indicated in dotted lines at R', (see Figs. 1 and 2) and in full lines in Fig. 3, carried in one end of each of the strips F'. These pins operate against the cam surfaces S', formed in a plate $A^2$, suitably mounted at one end and extending transversely across casing A, the lateral shifting movement imparted to the main operating plate Q by the cam head P, causing the pins R' to ride up against the inclined surfaces S', and hence not only effecting the actuation of the recording and registering mechanism of the various voting keys or pins which had previously been moved into voting position, but also restoring all of the voting keys or pins which had previously been shifted into voting position back to normal position and locking them in position.

Under the laws of some of the States, group voting is permitted where several candidates for the same office are to be elected. It is among the purposes of my invention to provide means for enabling a voter to cast a vote for each party candidate for the office, or to cast one vote for a candidate for the same office on each of several tickets. I have shown an arrangement for accomplishing this purpose, wherein a voting key or pin R is provided for each group candidate on each party ticket, similar to the arrangement above described with respect to individual candidates. But I provide one locking plate $B^2$ for each group of each ticket, said locking plates $B^2$ corresponding in purpose, function and operation to the locking plates K' above described, and arranged in a transverse row or series, as most clearly indicated in Figs. 1, 2 and 5, and each plate provided with guiding slots $C^2$ and guide pins $D^2$. Each of the voting pins or keys R is connected to a slide block C C. A similar arrangement is provided for each of the voting keys or pins R of the entire apparatus, so that whenever the voting pin R is moved said block C C moves with it, being or forming part of the voting key or pin itself. In the case of the group voting construction shown more clearly in Figs. 1, 2, 5 and 6, the block C C is provided with a projecting pin $D^6$, arranged to coöperate with a cam slot, indicated in dotted lines at $E^2$, in Fig. 5, and in cross-section in full lines in Fig. 6, formed in a block $F^2$, suitably riveted or otherwise secured to a plate $G^2$, thus constituting in effect a cam block, so that when the voting pin R is shifted or moved to permit the pin $D^6$ to enter the cam slot or groove $E^2$ of block $F^2$, said block and with it strip or plate $G^2$ will be shifted in one direction or the other according to whether the pin $D^6$ is inserted or moved into the slot or is withdrawn or moved out of the slot. The strip or plate $G^2$ extends transversely across the entire box or casing, so that when said strip or plate is shifted by the movement of any one of the voting keys or pins R, said plate forms a lock for all of the other voting pins of all the other groups. This locking result is accomplished, as will be evident, by reason of the fact that the cam grooves $E^2$ of all the other voting pins R of all the other groups will be displaced or moved, by shifting plate or strip $G^2$ as above described, through the manipulation of one of those voting keys out of engaging or coöperative relation with respect to the pins $D^6$ of all the voting pins except the one which has been manipulated. In other words, I provide a series of cam grooves or pins so related that when one pin is in engagement with a cam groove all the other cam grooves are carried out of engaging relation with respect to their associated pins, thus constituting a lock.

The operation of the group voting arrangement above described is simple, while at the same time it enables a voter after having voted for all the group candidates on a party ticket to change his vote in any desired way. Suppose a straight party ticket is voted, thereby advancing or shifting the voting pin or key for each candidate on any particular group into voting position. Such movement would result in the pin $D^6$ associated with each voting key or pin for each group candidate on the party ticket to enter its coöperating and corresponding cam groove $E^2$ in the locking plate or strip $G^2$, thereby shifting said locking plate so as to lock against movement into voting position the voting keys or pins of all the other group candidates of all the other party tickets. Now, if a voter desires to vote for one or more candidates on some other ticket beside the straight party ticket which he had previously voted he restores or shifts into initial or normal position the voting key or pin of the particular group candidate against whom he wishes to vote, which movement through the engagement of the pin $D^6$ with its coöperating cam slot $E^2$ restores the locking plate or strip $G^2$ to its initial position, thereby unlocking all of the voting keys or pins of the entire apparatus, those previously voted as well as those which have not been voted, thereby enabling the voter to move into voting position the voting key or pin of the particular group candidate for whom he desires to cast a vote, and the moment that voting pin or key is moved into voting position the group voting parts are again locked in voting position by reason of the coöperating effect of pin $D^6$ and its corresponding cam slot associated with the last key or pin which has been shifted.

In order to prevent a voter from voting for more than the number of candidates appearing in the group arrangement it is desirable to provide means for locking the apparatus so as to prevent more than the voting pins or groups corresponding to any one group or to the candidates of any one ticket from being voted simultaneously. I accomplish this object in a simple and efficient manner by associating with each voting key or pin a pivoted spring pressed pawl H², the function of which is to prevent a voter from simultaneously moving into voting position a group voting key or pin on more than one ticket.

Of course, it will be understood that all of the group voting keys or pins on any one ticket may be simultaneously moved or shifted into voting position. The construction for effecting this simultaneous movement of all the voting keys or pins R is shown at the top of Fig. 5, wherein the main operating or restoring key plate Q is broken away. Associated with each group of the group voting pins or keys are a series of slotted locking plates, indicated in Fig. 5 by dotted lines at J² and by full lines in Figs. 6 and 7, arranged end to end and provided with slight longitudinal movement by reason of guide pins K² operating in slots L², similar in arrangement, function and operation to the locking plates K' above described, but said plates J² are arranged in parallel relation with respect to the party voting strip or plate F' adjacent to the group voting pins. A pointed spring pressed locking pawl M² shown in Fig. 6 and by dotted lines at the top of Fig. 5, is arranged to be projected endwise into position to enter between the proximate ends of adjacent lock plates J², and when one locking pawl M² is thus projected none of the other locking pawls in the same group can be operated. The locking plates J² are carried by a supporting slide plate N², which may be shifted bodily and laterally away from the party voting strip F' in any convenient manner where it is desired to vote all of the group voting pins of the party ticket associated therewith, as, for instance, by means of pins O² operating in cam slots P². Thus, when all of the group candidates on any particular party ticket are to be voted for, the actuation of the party voting strip F' corresponding thereto effects a laterally shifting movement of supporting plate N² through the engagement of the pins O² and cam slots P². If, however, after a straight party ticket has been voted throughout—that is, after all the voting keys or pins of any particular party ticket have been moved into voting position—the voter should desire to vote for some other group candidate on another party ticket, the voting pin or key of any one or more of the candidates against whom he desires to cast his vote on the party ticket he has voted are returned or restored to initial position, which unlocks the group voting apparatus and enables the voter to vote for any other candidate. The supporting plate N² is restored to its initial position to form a lock for individual voting keys or pins R by the return or restoration of party voting strip F', as will be readily understood. Of course, it will be understood that the voting pins or keys R operate in slots indicated in Fig. 5 by dotted lines at Q² in the party voting strip F'. This also applies to all the voting keys or pins R throughout the entire apparatus, so that each individual voting key or pin R may be shifted or moved laterally with respect to itself and in the direction of the length of the strip F', without effecting a complete restoration of said party voting strip F' to its initial position, but the return of the party voting strip F' to initial position will carry all of the voting pins or keys associated therewith to their initial or normal voting position. The pawls H² above referred to are pivotally mounted upon the upper or top locking key plates B², so that when a group voting key R is moved into voting position it engages the point of its associated pawl, thereby shifting laterally the adjacent and associated key locking plate B², thereby permitting such key to pass beyond the end of its associated pawls H². Of course, if all of the group voting keys or pins of any particular ticket are simultaneously shifted or moved, the corresponding pawls H² will be simultaneously engaged, thus effecting the spreading apart endwise of the proximate ends of adjacent locking key plates B². In other words, the points of the pawls H² perform the same function in effecting the shifting movement of the plates B² of the group voting apparatus that the corner notches or grooves L' accomplish with respect to the locking plates K', and by pivotally mounting the pawls H², it will be seen that they offer no material obstruction to the withdrawal of the voting keys or pins in the movement thereof restoring the same to initial or normal position ready to be voted.

The locking pawls M², above described, may be shifted or moved endwise in any suitable or convenient manner, as, for instance, by means of pins A³ coöperating with the beveled ends B³ of the pawls or pins M². These pins are carried by the blocks C C, and they operate through slots indicated in dotted lines at C³ in the associated party voting strip F'. In order to enable the pins A³ to pass by the locking pawls M² freely when being restored to initial or normal position ready for their associated voting pins or keys to be voted, the locking pawls M² are provided with pivoted end sections or portions D³, (see Fig. 6) which yield downwardly and are normally held in locking relation by a spring E³, as clearly shown in Fig. 6.

Under the laws of some localities certain parties are permitted to vote at elections for certain candidates and not for others, as, for instance, women are permitted to vote for certain candidates, as school trustees, but not for other candidates. It is desirable, therefore, to provide means whereby in a voting machine such as above described provision is made for permitting the voting and registration of the votes of women. I will now describe the construction by which this result is accomplished, referring particularly to Figs. 1, 2, 4 and 8, wherein reference sign $F^3$ designates a strip or plate similar in construction and arrangement to the party strips or plates $F'$, above described. Connected to strip $F^3$ are lugs $G^3$, (see Fig. 8) between which works an arm $H^3$, arranged to be thrown in one direction or the other in any convenient manner, as, for instance, by means of a short shaft $J^3$, carrying a handle $K^3$ by which said shaft may be rocked. By reason of the engagement of arm $H^3$ with lugs $G^3$, when said arm is rocked in one direction or the other, strip or plate $F^3$ is moved endwise in one direction or the other. Carried by strip or plate $F^3$ are a series of pins $L^3$, one for each set of locking plates $K'$ and $B^2$, said pins operating through slots $M^3$ in plate Q and arranged when said plate or strip $F^3$ is shifted or moved endwise in one direction to enter slots or notches $N^3$ formed in the edges of locking plates $K'$ and $B^2$, thereby locking said plates against movement and hence preventing any of the voting keys or pins R from being shifted or moved into voting position. A pin $L^3$ is omitted, in one of the locking plates $K'$, as indicated at the point $O^3$, Figs. 1, 2 and 8, so that when strip or plate $F^3$ is shifted endwise in a direction to lock all of the other locking plates $K'$ and $B^2$ one of the plates $K'$ is left unlocked so as to permit a voter to vote for any candidate corresponding to the unlocked plates $K'$. Now, by arranging the names of the candidates for whom women are entitled to cast their votes on the line of locking plates $K'$ from which the locking pin $L^3$ is omitted and then shifting the strip or plate $F^3$ as above described to lock all the other voting keys or pins against movement into voting or registering position, then a woman voter may cast her ballot in the machine for the candidate for whom she desires to vote and whether such candidate is on one party ticket or another party ticket. Of course, it will be understood that when such a voter moves the voting pin or key R corresponding to the particular candidate for whom she desires to cast her ballot into voting position she thereby locks the corresponding series of plates $K'$, so as to prevent another voting pin or key in the same series from being moved or shifted into voting position. She is at liberty, however, to change her vote from one party candidate to another party or other candidate for the same office by simply restoring the particular voting pin or key which she has moved into voting position to initial or normal position and shifting or moving the voting pin or key corresponding to another candidate for the same office into voting position, thereby again locking all of the other voting keys or pins of the same series or corresponding to the candidates for the same office. After she has thus satisfactorily arranged her ballot, by imparting the final half revolution to the casing, as, for instance, when she leaves the voting booth, the strip or plate $F^3$ is returned to its initial or normal position so as to carry the pins $L^3$ out of engaging or locking relation with respect to the notches $N^3$ in the locking plates $K'$ and $B^2$, and this return of strip or plate $F^3$ may be effected in identically the same manner as in the case of the party voting strips or plates $F'$, as above described, namely, by means of a pin or stud $P^3$, (see Fig. 8) engaging an inclined or cam face $Q^3$, see Fig. 1, of plate or strip $A^2$, as will be readily understood.

It may sometimes be desirable to provide means whereby a voter may cast a ballot for a party whose names or candidates are not placed upon the machine, that is, it may be desirable to provide means whereby a voter may make up his own ticket without voting for any candidate upon any of the regular tickets. I provide a simple arrangement for accomplishing this result which I have found to be simple and efficient, wherein I provide a slot or opening $R^3$ through a plate $A^4$, arranged to be brought into and out of register with a corresponding chute $S^3$, (see Figs. 1, 2 and 11) said chute being arranged to deliver or deposit into the interior of the casing. The chute $S^3$ is formed in or through the main plate Q. The plate $A^4$ may be shifted in any convenient manner, as, for instance, by means of a hand grip or key $B^4$, similar to the party or individual voting keys $G'$ and R, above described, and having registering mechanism associated therewith, see Fig. 11. The plate $A^4$ is provided with an inclined or cam slot, indicated by full and dotted lines at $C^4$, in Figs. 1 and 2, in which the stem of voting key $B^4$ operates so that when said voting key is moved in one direction the slot $R^3$ and chute $S^3$ are brought into register, and when said key is moved in the opposite direction said slot and chute are brought out of register, and when said slot and chute are brought into register the voter may deposit therethrough a ballot containing the names of the candidates for whom he desires to cast his ballot. When this part of the apparatus is employed in effecting the casting of a ballot, it is desirable to lock all of the other party and individual candidate voting keys. This result is accomplished by means of a strip or plate, indicated by dotted lines at $D^4$, said strip carrying a pin $E^4$, operating in an inclined slot $F^4$ formed in the edge of plate $A^4$, whereby when said plate A⁴ is shifted endwise into position for slot R³ and chute S³ to be brought into register, pins G⁴ carried thereby are permitted to enter slots or notches H⁴ formed in the edges of locking plates K' and B², thereby locking said plates and hence locking the entire apparatus against the possibility of any voting keys, whether they are party or for an individual candidate, from being moved into voting position. By forming the slots H⁴ upon an incline, as clearly shown in Figs. 1 and 2, the locking plates K' and B² associated therewith may be coincidently and correspondingly shifted endwise sufficiently to lock the entire apparatus.

In order to enable a voter to cast an irregular ballot—that is, a ballot in which he votes for certain party candidates and also for one or more individual candidates of his own selection and not the nominee on any party ticket for any particular office—I provide a series of voting keys or pins, indicated at M⁴, and marked in Fig. 2 "Irregular ticket," said keys or pins being associated with inclined slots N⁴ formed in the edges of locking plates K' and B² at one side of the casing whereby when any one of said irregular ticket voting keys or pins M⁴ is manipulated all the voting keys corresponding to the candidate for the same office are locked against manipulation, and if the voting key or pin of any particular candidate has been shifted or moved into voting position the corresponding voting key or pin on the "irregular ticket" cannot be shifted or moved into voting position. The manipulation of voting keys or pins M⁴ effects an endwise shifting movement of the corresponding plates K', B², through the operation of pins M⁴, in the inclined slots N⁴. This endwise shifting movement of said associated locking plates K' and B² may serve to bring slots or openings J⁴ therein into registering relation with chutes indicated in dotted lines at K⁴, Fig. 1, and in full lines Fig. 4, one of said sets of slots being shown in registering relation in Fig. 2 at L⁴, thus enabling the voter to deposit a printed or written ballot for individual candidates not on any of the regular tickets.

In certain of the States the method known as cumulative voting is employed for the purpose of enabling a minority party to obtain representation, or a party faction to elect a favorite. In other words, if a locality is entitled to a certain number of elective officers—for example, three members of a school committee—the minority party may present a single candidate and concentrate its entire cumulative vote, which would otherwise be distributed among the three candidates, upon a single nominee. And in the case of a favorite, each voter may concentrate his two or three votes upon one candidate even if two or three have been nominated by his party. In accordance with the principles of my invention, I provide means by which this result may be accomplished. I have set forth an arrangement by which an irregular ticket, or a ballot containing partly regular party nominees and partly individual candidates, might be voted. I may employ this same arrangement for the purpose of cumulative voting. In this case the names of all the party candidates for the particular committee or board or other office are placed opposite a single voting key for that party and office. When a voter wishes to vote the straight ticket he proceeds as usual and his vote is registered against all of his party nominees for that office, and the votes are given the proper weight of one, one and a half, or three, according as there are three or two or one candidates, for example. If he desires to throw his cumulative vote for one or two candidates when two or three have been nominated by his party, it is simply necessary to vote the selected candidates upon the irregular ticket for that office.

After the voting has closed it is desirable to provide means whereby the danger of tampering with the registering mechanisms is prevented during the removal or transportion of the voting machine from the polling place to the officials in whose custody the machines are to be retained. It will be noted from the foregoing description that when the last voter leaves the voting booth he imparts a half revolution to the casing, whereby leaving all of the voting pins or keys last placed in position, in locking relation with respect to the registering mechanism. When, therefore, the last voter leaves the booth the voting pins or keys are left in normal position, as indicated in Fig. 1 at the point where the top plates are broken out. In order to still further efficiently lock the parts in these positions and to prevent tampering with the ballots as recorded I propose to provide the casing with a hinged top or cover O⁴, and I provide said hinged top or cover O⁴ with a lug or projection P⁴, (see Fig. 12) arranged to coöperate with an inclined lug Q⁴ formed on a locking plate or strip R⁴ (see Fig. 12, also dotted lines in Figs. 1 and 2.) This strip R⁴ is provided with a series of pins S⁴, arranged to enter slots or seats A⁵ formed in the edges of locking plates K' and B² when said strip R⁴ is shifted endwise while the parts are occupying their normal positions. In Fig. 1, in which the parts are in their normal positions, that is immediately succeeding the registering of a vote, the pins S⁴ are in position to be shifted into engaging relation with respect to the notches or seats A⁵, and as the last voter to leave the voting booth leaves the apparatus in the normal position shown in Fig. 1, it will be at once clear that thereafter by closing the lid or top $O^4$ of the casing thereby bringing lug $P^4$ into engagement with the inclined face of lug $Q^4$, the locking strip $R^4$ is shifted endwise, thereby bringing locking pins $S^4$ into notches $A^5$, and locking the entire apparatus against the possibility of displacement, and locking the voting keys or pins last voted in engaging relation with respect to the registering mechanism. The endwise movement of strip or plate $R^4$ through the engagement of lugs $P^4$ $Q^4$ may be yieldingly opposed in any simple or convenient manner, whereby when the top or cover $O^4$ is again raised said strip or plate $R^4$ will be restored to its normal or initial position, thereby unlocking the mechanism. This result may be accomplished by means of a spring $L^6$, see Fig. 12. If desired, and in order to still further insure against the possibility of tampering with the voting mechanism, the top $O^4$ of the casing A may be provided with a spring snap lock indicated at $B^5$, Fig. 13, arranged when said top is closed to snap into a seat formed to receive the same in the portion $C^5$ of the casing. The spring lock $B^5$ may be detached when it is desired to open up the top or cover $O^4$ of the machine in any suitable or convenient manner. The part $C^5$ of the casing is hinged or pivoted, as clearly indicated in Fig. 4, and may be locked in closed position by any ordinary pad-lock, or other form of lock, as indicated at $R^5$, Fig. 13. In order to close and lock up the mechanism the hinged cover $O^4$ is closed, thereby causing the spring lock $B^5$ to snap into locking engagement, and then the part $C^5$ of the casing is locked to the part $D^5$ by the padlock $R^5$, and the key thereof retained in the possession of the election official authorized to retain the same. In order to open up the machine for voting the lock $R^5$ is unlocked and the hinged part $C^5$ raised sufficiently to enable the spring lock $B^5$ to be detached, then the part $C^5$ is lowered and locked while the hinged cover $O^4$ is raised. Of course, the same results may be accomplished in any other suitable or convenient manner.

In order to ascertain at the end of the voting the total vote cast for each candidate all that is necessary to do is to read the registering wheels or mechanism associated with each voting pin or key. In order that this may be accomplished accurately and expeditiously, I propose to employ means for printing the record made by each registering mechanism, and to this end I divide the casing A into two parts $C^5$ and $D^5$, the part $C^5$ being hinged to the part $D^5$, as indicated in Fig. 4, and said part $C^5$ carrying the voting and registering mechanism above described. Within the part $D^5$ of the casing I arrange suitable means for printing the record of each registering mechanism. This may be of any simple, suitable or convenient construction. In the form shown I employ a frame $E^5$ arranged to rest upon cams $F^5$, (see Figs. 3 and 4) said cams being mounted upon shafts $G^5$, suitably connected together through crank arms and links, as indicated in dotted lines in Fig. 4, so as to rotate coincidently. The printing frame $E^5$ carries a printing platen $H^5$, associated with each registering mechanism. In order to secure the best results and to provide against any inequalities in construction and mounting of the parts, each printing platen $H^5$ is preferably yieldingly supported within the printing frame $E^5$. This result may be accomplished in any simple or convenient manner. I have shown an arrangement wherein a supporting stem $J^5$ is provided for each platen, said stem being received in a seat formed in the printing frame and resting upon a spring $K^5$, each platen being suitably guided, if desired, by guiding pins $L^5$. An ink ribbon $A^6$ may be interposed between the printing plates and the corresponding registering wheels, as indicated in Fig. 3. In this manner, by suitably rotating one of the shafts $G^5$, such rotation is simultaneously imparted to the other of said shafts, thereby raising the printing frame $E^5$ through the action of cams $F^5$, and hence enabling a printed record to be secured from the registering mechanism associated with each voting key or pin upon a sheet of paper properly inserted, and since each voting key or pin corresponds to each candidate for each office and has associated therewith a registering mechanism, it will be seen that at a single impression a printed record is secured of the total votes for every candidate. In practice it is desirable to also make a record at the commencement of the voting in order to insure that all the registers are set at the zero position. And it is further important that the record can be made without opening the casing to permit the machine to be tampered with. Accordingly I arrange a slot $A^{11}$ at one side of the casing normally closed by a plate $A^{12}$ which may be retained in position by a screw $A^{13}$ or any other desired means (see Fig. 3). When the voting is about to commence, a paper may be inserted in the slot and an impression taken. At the same time, no opportunity is given to tamper with the registers. At the conclusion of the voting another record should be taken in the same manner. It is obvious that various arrangements may be employed for inserting and obtaining this record sheet, and I do not wish to be limited or restricted to the particular arrangement above described.

The shifting of plate Q, which is accomplished as above described, by rotating the machine to effect a register of the ballot as arranged by the voter, operates to restore the locking strips through the coöperation of pins R' P³ and cams S' Q³ so as to carry all of the voting keys or pins, which act as locking pins for the plates K' B², out of locking relation with said plates, and the same shifting movement of plate Q causes the projecting ends of said plates K' B² which are next to that side of the casing A which is approached by the shifting plate Q to engage said side of the casing, thereby restoring said plates to initial or normal position positively and without the necessity for the use of springs or other means for accomplishing this result.

It is believed that the operation of the machine will be readily understood from the foregoing description, but in order to enable the same to be fully and clearly understood, I will briefly describe the same as follows: The machine is placed in convenient position in the voting booth so that as ent position in the voting booth so that as the voter enters the booth to register his vote he imparts one-half a revolution to the casing upon its axis. This half revolution operates to shift the locking plate Q by means of the engagement therewith of the cam head N, thereby shifting all of the voting pins or keys R out of engaging or locking relation with respect to the registering mechanism associated therewith. This movement places all of the party and individual voting keys or pins in condition to be manipulated. The voter may then vote a straight party ticket if he so desires by manipulating the voting key or pin G' corresponding to the party ticket he desires to vote. The voting of a straight party ticket results in placing all of the voting keys or pins corresponding to the party ticket into voting position with respect to their associated recording mechanisms. This also locks all of the other party and individual voting keys or pins. If, after having manipulated a party voting key or pin the voter should change his mind and desire to vote some other party ticket, he returns or restores to initial position the party voting key which he has first placed in voting position and shifts or moves the party voting key of the party for whom he desires to vote. If the voter desires to vote a split ticket he manipulates the party voting key of one party, as above described; he then returns or restores the individual voting key or pin of the candidate on the party ticket against whom he desires to vote, which movement releases the voting keys or pins corresponding to the same candidate for the same office on the other party tickets, but without disturbing any of the other voting keys or pins which had previously been manipulated or moved into voting position. He then shifts or moves into voting position the individual voting key or pin of the particular candidate for the office in question for whom he desires to cast his ballot. In a similar manner he arranges the ballot for the group candidates, not being permitted to vote for more than one candidate for each office for the ordinary offices, nor for more than the total of the group candidates to be voted for on any one ticket, but he is permitted to arrange his group ballot so as to cast a vote for only as many group candidates as he is entitled to vote for, but they need not be on the same party ticket. If he desires to vote cumulatively, that is, to cast two or more votes for any candidate where permitted by the election laws of the locality, as for instance, if three candidates are to be elected for any one office and the election laws permit a voter to cast two or three ballots for any one individual for such office, this object can be accomplished by the voter depositing a properly prepared written or printed ballot through the slot J⁴, and chute K⁴, as above described, corresponding to the particular office for whom the cumulative votes are to be cast. If a woman is to vote for a candidate for a special office, then the shaft J³ is rotated to lock all of the apparatus except the particular voting key for the particular candidate for whom the woman is entitled to vote. If an irregular or individual party ticket is to be voted, then the voting key B⁴ is manipulated, enabling the individual to deposit a prepared ballot through the slot R³, or if irregular and independent candidates of the voter's own choosing and not the nominee of any particular party is to be voted for for any particular office, then the corresponding keys M⁴ are manipulated as above explained. When the voting keys are properly manipulated and arranged according to the will of the voter, the voter leaves the voting booth, thereby imparting a final half revolution to the casing, which movement through the shifting imparted to the plate Q by means of the cam head moves the voting keys or pins into engagement with their associated registering mechanisms and effects the registration, leaving the parts in their normal position shown in Fig. 1. Each complete revolution of the casing is registered by the registering mechanism K, L and M. Each return of the plate Q to normal position effects a registration of the ballot for each candidate as arranged by the voter through the engagement of the voting keys or pins R with their associated registering mechanisms. Reverse rotations of the casing are prevented by the locking pawl G and ratchet wheel F. After the last voter has voted as above described, the entire apparatus is locked in the normal position in which the last voter left the apparatus, as shown in Fig. 1, by shifting the locking strip R⁴. This may be accomplished, as above explained, by closing the top or cover O⁴, and hence shifting the locking plate R⁴. The closing of the top or cover causes the spring catch B⁵ to be actuated to lock said top or cover in closed position, and then the apparatus is secure against possibility of tampering by reason of the fact that the part C⁵ is locked to the part D⁵ of the casing. Before this locking is accomplished, however, or afterward if desired, as many different printed records may be obtained from each of the registering mechanisms as may be desired by manipulating the shafts G⁵, thereby advancing the yieldingly supported printing platens H⁵ to take an impression of the registration of each registering mechanism upon sheets suitably interposed between the ink ribbons and the registering wheels.

Having now set forth the object and nature of my invention and a construction embodying the principles thereof, what I claim as new and useful and of my own invention, and desire to secure by Letters Patent, is:

1. In a voting machine, a rotarily mounted casing, voting keys or pins carried thereby and independently movable into voting position, registering mechanism associated with each voting key or pin but in inoperative relation with respect thereto except when such keys or pins occupy voting position, and means operated by the rotary movement of said casing for simultaneously moving all of the keys which occupy voting position to operate their associated registering mechanisms, as and for the purpose set forth.

2. In a voting machine, a rotarily mounted casing, voting keys or pins arranged therein and independently movable into voting position, a registering mechanism associated with each voting key or pin but in inoperative relation with respect thereto except when such voting keys or pins occupy voting position, means operated by the rotary movement of said casing for simultaneously moving all of the voting keys or pins occupying voting position to operate their associated registering mechanisms, and means also actuated by the rotary movement of said casing for restoring the parts to their intial positions, as and for the purpose set forth.

3. In a voting machine, a rotarily mounted casing, voting keys or pins arranged therein and independently movable into voting position, a registering mechanism associated with each voting key or pin but in inoperative relation with respect thereto except when such pins or keys occupy voting positions, a slide plate connected to all of said keys or pins, and means actuated by the rotary movement of said casing for shifting said plate, as and for the purpose set forth.

4. In a voting machine, a casing rotarily mounted, a slotted slide plate carried thereby, voting keys or pins mounted in the slots of said plate and independently movable through such slots into voting position, a registering mechanism associated with each voting key or pin but in inoperative relation with respect thereto except when such pins occupy voting position, and means actuated by the rotary movements of said casing for shifting said plate whereby all of the keys or pins occupying voting position simultaneously operate their associated registering mechanisms, as and for the purpose set forth.

5. In a voting machine, a casing rotarily mounted, a slide plate arranged therein, said slide plate being slotted, voting keys or pins independently movable into voting position through the slots in said plate, registering mechanism associated with each voting key or pin but in inoperative relation with respect thereto except when such keys occupy voting position, and a fixed cam arranged to engage said slide plate whereby when said casing is rotated said plate is shifted to move the keys or pins occupying voting position so as to operate their associated registering mechanisms, as and for the purpose set forth.

6. In a voting machine, a rotarily mounted casing, voting keys or pins arranged therein and independently movable into voting position, a registering mechanism associated with each voting key or pin but in inoperative relation with respect thereto except when the keys or pins are in voting position, a slide plate arranged within said casing and operating when shifted to move said keys or pins, means operated by the partial rotation of said casing for shifting said plate to move the keys or pins with reference to their associated registering mechanisms, and means operated by the completion of the revolution of said casing for restoring said parts to initial position, as and for the purpose set forth.

7. In a voting machine, a casing, a pedestal upon which said casing is rotarily mounted, voting and registering mechanisms arranged within said casing, means actuated by the rotation of said casing for operating said registering mechanisms, and means for registering the rotations of said casing, as and for the purpose set forth.

8. In a voting machine, a casing, a pedestal upon which said casing is rotarily mounted, voting keys or pins and registering mechanisms associated therewith, said keys or pins being movable into and out of coöperative relation with respect to their associated registering mechanisms, means actuated by the rotary movement of said casing for moving said pins relatively to their associated registering mechanisms, and means for registering the rotary movements of said casing, as and for the purpose set forth.

9. In a voting machine, a casing, a pedestal upon which said casing is rotarily mounted, voting keys or pins carried by said casing, a registering mechanism associated with each voting key or pin but in inoperative relation with respect thereto except when such pins occupy voting position, means actuated by the rotary movements of said casing for moving said pins relatively to their associated registering mechanisms to operate the latter, means for preventing reverse rotations of said casing, and means for registering the rotary movements of said casing, as and for the purpose set forth.

10. In a voting machine, a pedestal, a central standard arranged therein and in fixed relation, a casing rotarily mounted upon said pedestal, a cam carried by said central standard, a plate carried by said casing and arranged to be engaged by said cam whereby said plate is shifted when said casing is rotated, voting keys or pins operating through said plate, a registering mechanism associated with each key or pin, the shifting movements of said plate operating to move said pins to actuate their associated registering mechanisms, as and for the purpose set forth.

11. In a voting machine, a pedestal, a fixed standard carried thereby and having a cam head, a casing journaled to rotate with respect to said standard, a plate carried by said casing and arranged to be engaged by said cam head whereby said plate is shifted when said casing is rotated, voting keys or pins operating through said plate and independently movable into voting position, a registering mechanism associated with each voting key or pin but in inoperative relation with respect thereto except when such pins occupy voting position whereby when said casing is rotated and said plate is shifted said voting keys or pins occupying voting position are moved to actuate their associated registering mechanisms, as and for the purpose set forth.

12. In a voting machine, a pedestal, a casing journaled to revolve thereon, a ratchet gear connected to said casing, a spring pressed pawl coöperating with said ratchet to permit rotation of said casing in one direction only, voting keys or pins and registering mechanism associated therewith, and means actuated by the rotary movements of said casing for causing said pins to operate their associated registering mechanisms, as and for the purpose set forth.

13. In a voting machine, a pedestal, a fixed standard mounted therein and carrying a cam head, a casing journaled to revolve upon said pedestal and axially with respect to said standard, a plate arranged to be engaged by said cam head whereby when said casing is rotated said plate is shifted, said plate being slotted, voting keys or pins extending through the slots in said plate and independently movable into voting position, a registering mechanism associated with each voting key or pin but in inoperative relation with respect thereto except when said pins occupy voting position, said plate operating to move all of said pins or keys with respect to their associated registering mechanisms, as and for the purpose set forth.

14. In a voting machine, a casing, voting keys or pins arranged therein in party sets, a slotted strip through which all of the voting keys or pins of each party set operate whereby when said strip is shifted the corresponding party set of voting keys or pins is shifted, a slotted slide plate arranged to operate in a line transverse to the line of shifting movement of said strip, said keys or pins operating through slots in said palte, and means actuated by the shifting movement of said plate for returning or restoring any of the displaced or shifted strips, as and for the purpose set forth.

15. In a voting machine, a control plate, means for moving the same rectilinearly, strips mounted on said plate and partaking of the movements thereof, said strips being independently movable transverse to the line of rectilinear movement of said plate, voting keys or pins arranged to be shifted or moved by both said plate and strips, locking mechanism actuated by the movement of said keys or pins whereby when any one of said strips is moved to displace the keys or pins associated therewith the other strips are locked against movement, and means actuated by the rectilinear movement of said plate for returning or restoring the displaced strips to initial position, as and for the purpose set forth.

16. In a voting machine, a sliding control plate, a strip carried thereby and partaking of the movement of said sliding plate but capable of independent movement transverse to the line of movement of said plate, a pin carried by said strip, and a stationary cam arranged in the path of said pin when said plate is shifted, said pin engaging the cam surface to return or restore said strip to initial position, as and for the purpose set forth.

17. In a voting machine, a sliding control plate, a strip carried thereby and partaking of the sliding movements thereof but capable of independent movement, voting keys or pins controlled by the movements of said plate and strips, pins carried by each of said strips and coöperating stationary cams whereby when said plate is shifted any displaced strip is returned to normal position, as and for the purpose set forth.

18. In a voting machine, a sliding control plate, strips carried thereby and partaking of the sliding movements thereof but capable of independent movement relative thereto, voting keys or pins operating through said plate and strips, a registering mechanism associated with each of said voting keys or pins, and means for restoring the parts when shifted to initial position, as and for the purpose set forth.

19. In a voting machine, a sliding control plate and means for operating the same, independent strips carried thereby but capable of independent movement relative thereto, voting keys or pins operating through said plates and strips, said voting keys or pins being independently movable with respect to said plate and strips, whereby said keys or pins may be shifted or moved into voting position according to the will of the voter, and means actuated by the shifting movements of said plate for returning or restoring the parts to initial position, as and for the purpose set forth.

20. In a voting machine, a sliding control plate, independent strips carried thereby but capable of independent movement relative thereto, voting keys or pins extending through such plate and strips but capable of independent movement relatively to each other and said plate or strips, a registering mechanism associated with each of said pins or keys, and means operated by the sliding movement of said plate for returning or restoring the parts to initial position, as and for the purpose set forth.

21. In a voting machine, a sliding control plate, strips carried thereby but capable of independent movement relative thereto, voting keys or pins operating through said plate and strip, a registering mechanism associated with each of said voting keys or pins, locking mechanism actuated by the movement of said keys or pins in registering position with respect to their associated registering mechanisms for preventing the movement of corresponding keys into such positions, and means operated by the sliding movements of said plate for returning or restoring all of the parts to initial position, as and for the purpose set forth.

22. In a voting machine, voting pins or keys arranged in party groups, means for simultaneously moving all of the pins of each party group into voting position, means actuated by the movement of a party group of keys into voting position for locking all of the other group keys or pins, and means for preventing more than the aggregate number of each group of voting keys or pins to be moved into voting position at any one time, as and for the purpose set forth.

23. In a voting machine, voting keys or pins arranged in groups, a registering mechanism associated with each pin or key, said pins or keys being independently movable into voting position, means for preventing more than the aggregate number of the keys or pins composing any one group from being moved into voting or registering position at any one time, means for actuating said voting keys or pins when in voting position to operate their associated registering mechanisms, and means for restoring or returning all the parts to initial position, as and for the purpose set forth.

24. In a voting machine, voting mechanism, locking devices therefor including slide plates arranged to be shifted into locking position by the movement of the voting mechanism into voting position, a casing in which said parts are carried, a sliding control plate also arranged in said casing and carrying said locking plates, means for moving said slide plate to return or restore the voting mechanism to initial position, said movement carrying said locking plates into abutting relation against the side of said casing, whereby said locking plates are restored to normal or initial position, as and for the purpose set forth.

25. In a voting machine, and in combination with voting keys and associated locking and registering mechanism, an additional ticket voting mechanism including a voting key arranged to be manipulated to be brought into position to enable a voter to deposit a ballot, a registering mechanism associated with said additional ticket voting key but normally disconnected therefrom whereby said additional ticket voting key may be moved into voting position, means actuated by the movement of said additional ticket voting key into voting position for locking all of the other voting keys against movement into voting position, and means actuated by the movement of said additional ticket voting key when in voting position for actuating its associated registering mechanism, as and for the purpose set forth.

26. In a voting machine, the combination with voting keys or pins, a registering mechanism associated with each of said keys or pins and including a registering wheel having a series of pins or shoulders projecting from one side thereof, means for freely moving the associated voting key or pin into and out of voting position without engagement with said pins or shoulders, means for moving said associated pin or key into engaging relation with respect to said registering wheel when said key or pin is in voting position, and means for returning or restoring to initial position the voting key or pin when in engaging relation with respect to said wheel whereby said registering wheel is actuated, as and for the purpose set forth.

27. In a voting machine, a voting key or pin, a registering mechanism associated therewith and comprising a registering wheel having pins or shoulders projecting from one side thereof, said voting key or pin being freely movable into and out of voting position without affecting said registering wheel, and freely movable into and out of engaging relation with respect to said pins when in voting position, and means for shifting said key or pin into position to engage and actuate its associated registering wheel to change the count thereon, as and for the purpose set forth.

28. In a voting machine, the combination with a voting key or pin and an associated registering mechanism including a registering wheel having pins projecting from one side thereof, said pins being pointed, said voting key or pin having a beveled engaging portion arranged to coöperate with said pins, said voting key or pin being freely movable into and out of voting position without affecting the movement of said registering wheel and also movable into and out of engaging relation with respect to the pins upon said wheel, and means for actuating said voting key or pin when in engaging relation with respect to said registering wheel to operate said wheel to change the count thereon, as and for the purpose set forth.

29. A voting machine containing the following instrumentalities: a series of registering mechanisms, a voting key or pin associated with each registering mechanism and under the control of a voter but disconnected from its associated registering mechanism whereby it is freely movable into and out of voting position without affecting such registering mechanism, means for shifting said keys or pints to actuate their associated registering mechanisms, and means for releasing the actuating engagement of said keys or pins and their associated registering mechanisms to permit registration of a succeeding vote in like manner, as and for the purpose set forth.

30. A voting machine containing the following instrumentalities: a series of manually operated voting keys or pins, a registering mechanism associated with each key or pin but normally disconnected therefrom whereby such keys or pins are freely movable into and out of voting position to enable a voter to cancel, withdraw or change the voting position of the keys or pins at pleasure without effecting an actuation of the associated registering mechanisms, means for shifting the voting keys or pins when in voting position to actuate their associated registering mechanisms, and means for returning or restoring the parts to permit the registration of a succeeding vote in like manner, as and for the purpose set forth.

In witness whereof, I have hereunto set my hand this 24th day of August, 1903, in the presence of the subscribing witnesses.

WILLIAM A. SWAREN.

Witnesses:
S. E. DARBY,
CHAS. H. SEEM.